(12) United States Patent
Amr

(10) Patent No.: US 6,543,244 B1
(45) Date of Patent: Apr. 8, 2003

(54) TRANSPORT REFRIGERATION UNIT

(75) Inventor: Yehia Mahmoud Amr, Cairo (EG)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/005,100

(22) Filed: Dec. 3, 2001

(51) Int. Cl.$^7$ ................................................ B60H 1/32
(52) U.S. Cl. .............................. 62/239; 62/428; 62/429
(58) Field of Search ........................... 62/428, 429, 239

(56) References Cited

U.S. PATENT DOCUMENTS

| | | | | |
|---|---|---|---|---|
| 3,200,609 A | * | 8/1965 | Laing | 62/429 |
| 3,628,350 A | * | 12/1971 | Ruth | 165/127 |
| 3,729,952 A | * | 5/1973 | Macleod | 62/262 |
| 3,871,188 A | * | 3/1975 | Vold et al. | 62/262 |
| 4,726,197 A | * | 2/1988 | Megrditchian | 62/309 |
| 5,129,235 A | * | 7/1992 | Renken et al. | 454/90 |
| 5,351,503 A | * | 10/1994 | Sugimoto et al. | 62/429 |
| 5,605,055 A | * | 2/1997 | Salgado | 62/244 |
| 5,916,253 A | | 6/1999 | Amr et al. | |

* cited by examiner

Primary Examiner—William E. Tapolcai
Assistant Examiner—Mohammad M. Ali
(74) Attorney, Agent, or Firm—Carlson, Gaskey & Olds P.C.

(57) ABSTRACT

A transport refrigeration unit is utilized to cool a transport refrigerated container. Air cooled by an inclined evaporator is drawn through the evaporator by an evaporator transverse fan and discharged in the refrigerated container. Air drawn through a condenser by a condenser transverse fan approximately 1.2 to 1.5 times the size of the evaporator transverse fan is discharged outside the refrigeration unit. The axes of the pair of heat exchanger fans are substantially parallel to an axis of a motor shaft which drives the fans. A continuous belt passes over pulleys of the fans and motor shaft to drive the fans as the motor operates. A corrugated partition between the evaporator and the condenser insulates the walls of the refrigerated container and the frame of the refrigerated unit.

17 Claims, 2 Drawing Sheets

TRANSPORT REFRIGERATION UNIT

BACKGROUND OF THE INVENTION

The present invention relates generally to a transport refrigeration unit for cooling a refrigerated container which includes a pair of transverse fans with substantially parallel axes that are driven by a simplified drive mechanism and which discharges air drawn through the condenser outside of the refrigeration unit.

A transport refrigeration unit is typically utilized to cool a refrigerated container of a truck or trailer which transports refrigerated cargo, such as frozen food. The refrigeration unit is typically secured to the front wall of the truck or trailer at a main support frame. In a prior transport refrigeration unit, both axial and transverse fans are utilized to draw air through the evaporator and condenser. As the axes of the heat exchanger fans are not parallel, a complex drive system is utilized to drive the fans, increasing the complexity of the drive system.

Air drawn through the evaporator in a prior transport refrigeration unit must also make a 180° turn from entry into the evaporator to exit into the refrigerated container. As the air is required to make several turns, there is additional friction and loss of energy, reducing the capacity of the refrigeration system.

Additionally, in a prior transport refrigeration unit, air drawn through the condenser is directed over the compressor which is located in the lower section of the refrigeration unit. As the compressor heats during operation of the refrigeration unit, the heated discharged air from the condenser, which is cooler than the compressor, provides additional cooling of the compressor and drive package (motor and/or engine plus motor).

SUMMARY OF THE INVENTION

The transport refrigeration unit of the present invention cools a refrigerated container which transports refrigerated goods, such as frozen foods. Air drawn through an inclined evaporator by a transverse fan is cooled and released at the top of the refrigerated container, cooling the cargo contained in the refrigerated container. Preferably, the evaporator is angled approximately 25° to 45° from the trailer wall to increase the area of heat transfer.

Air is drawn through the condenser by a larger transverse fan and discharged outside of the refrigeration unit in the direction of road airflow during forward vehicle movement. Preferably, the condenser transverse fan is approximately 1.2 to 1.5 times the size of the evaporator transverse fan as there is a larger amount of air passing through the condenser.

The axes of the heat exchanger transverse fans are substantially parallel to the axis of a motor shaft which drives the fans. As all the axes are substantially parallel, one continuous belt passing over the heat exchanger fans pulleys and the motor shaft pulley drives the fans, simplifying the drive mechanism of the refrigeration unit.

The refrigeration unit further includes a partition including extensions located between the evaporator and the condenser to provide insulation. The extensions are positioned between the wall of the vehicle and the frame of the refrigeration unit to provide further insulation and preferably includes corrugations to further seal air flow.

Accordingly, the present invention provides a transport refrigeration unit including a simplified drive system which drives a pair of heat exchanger fans.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows.

DETAILED DESCRIPTION OF THE PREFERRED EMBODIMENT

Figure 1:
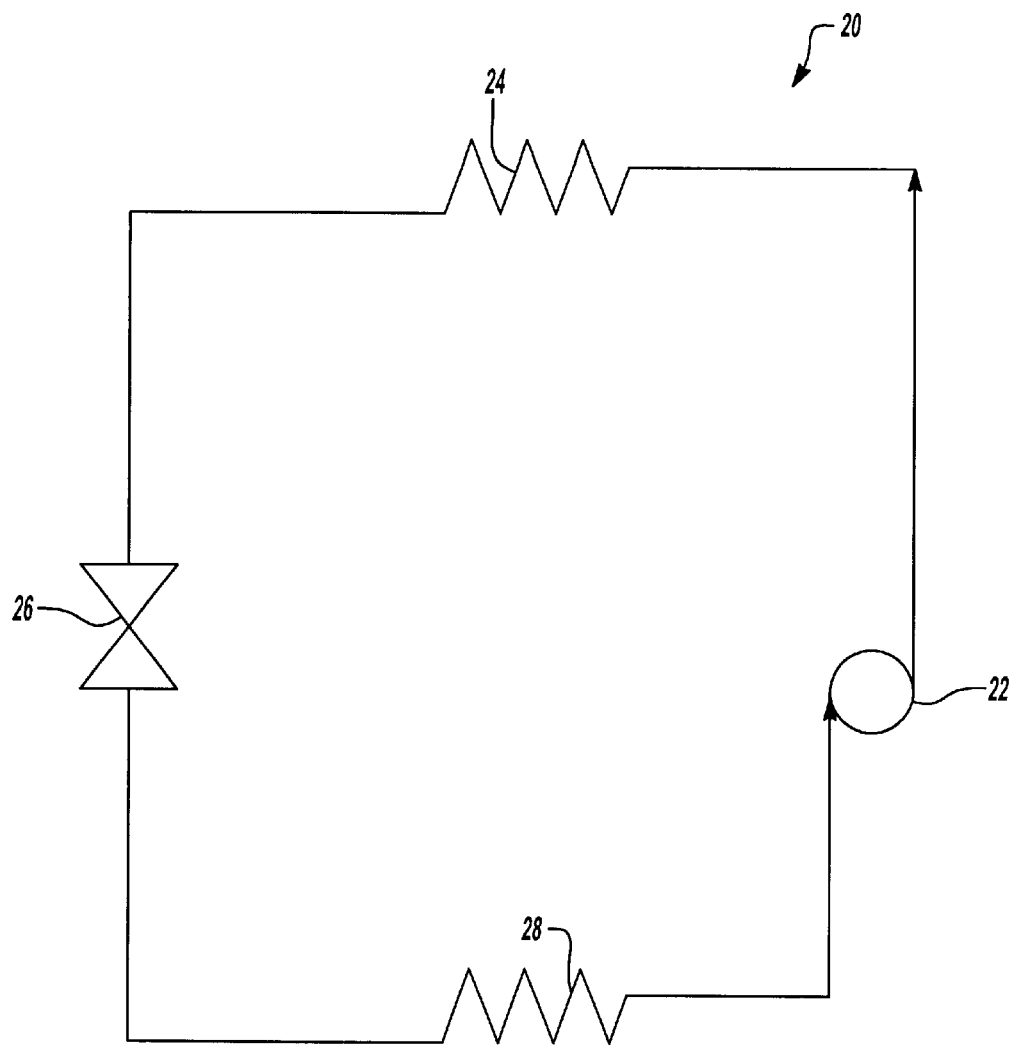
FIG. 1 illustrates a schematic diagram of a refrigerant cycle.

FIG. 1 schematically illustrates a refrigeration cycle 20. The refrigeration cycle 20 consists of a compressor 22, a heat rejecting heat exchanger (a condenser) 24, an expansion device 26, and a heat accepting heat exchanger (an evaporator) 28.

Refrigerant is circulated though the closed circuit refrigeration cycle 20. The refrigerant exits the compressor 22 at high pressure and enthalpy. As the refrigerant flows through the condenser 24 at high pressure, it loses heat and enthalpy, exiting the condenser 24 with low enthalpy and high pressure. As the refrigerant passes through the expansion device 26, the pressure of the refrigerant drops. After expansion, the refrigerant passes through the evaporator 28 and exits at a high enthalpy and low pressure. The air passing through inside the evaporator 28 heats and evaporates the refrigerant. As the refrigerant absorbs heat from the air, the cooled air then circulates through the refrigerant container 32, thus cooling the refrigerant container 32 and its contents. After the refrigerant passes through the compressor 22, it is again at high pressure and enthalpy, completing the refrigeration cycle 20. As shown schematically, the refrigerant cycle 20 is preferably included as part of a transport refrigeration unit 30, such as commonly utilized to cool a vehicle refrigerated container 32. As is known, such units 30 are typically incorporated into refrigerated containers 32 carried by trucks or trailers, or other sources, to transport frozen goods such as frozen food.

Figure 2:
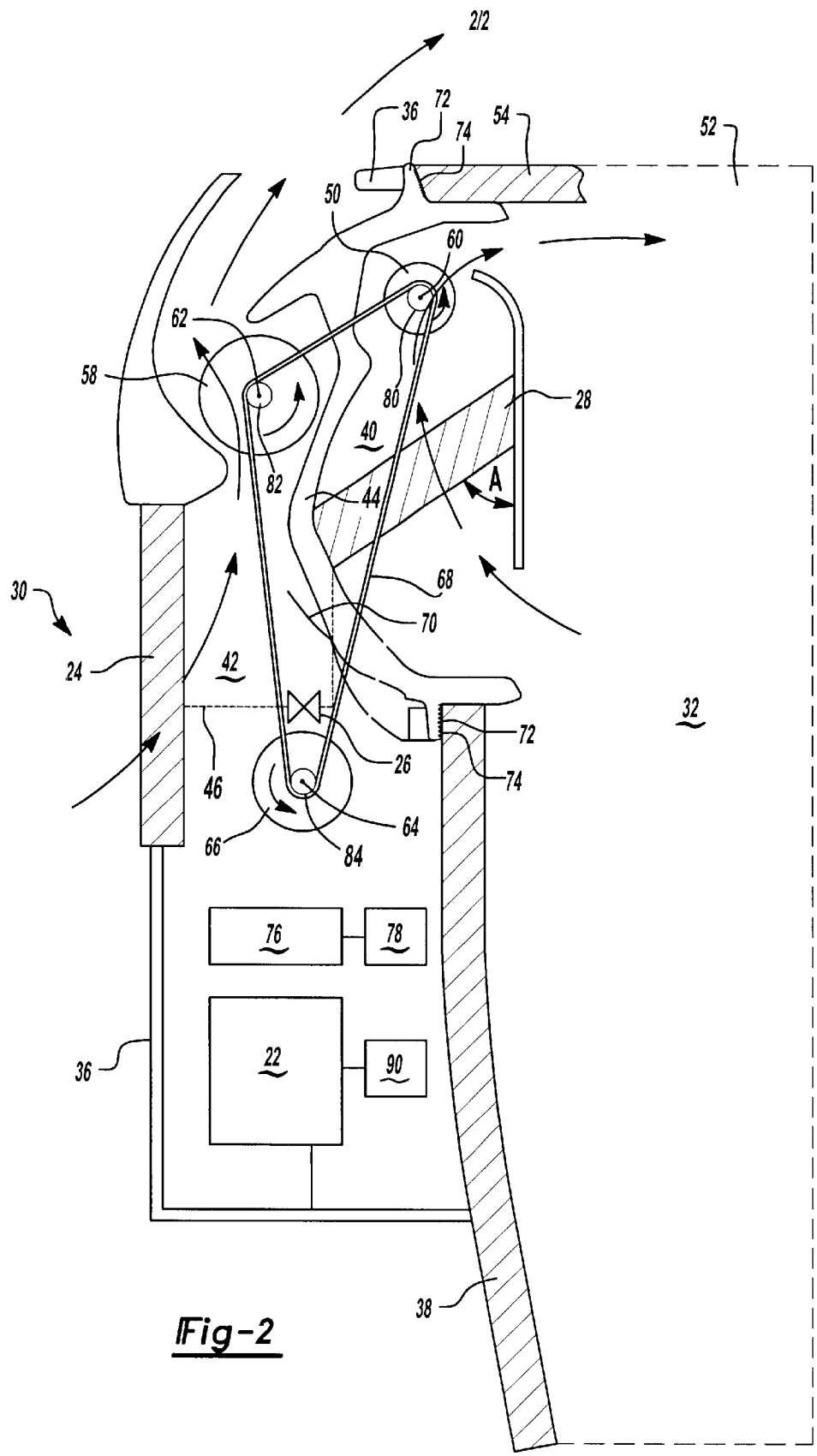
FIG. 2 illustrates the transport refrigeration unit of the present invention utilized to cool a refrigerated container.

FIG. 2 illustrates the refrigeration unit 30 of the present invention. The refrigeration unit 30 is secured to the front wall 38 of the refrigerated container 32 at the main support frame 36 of the refrigeration unit 30. The refrigeration unit 30 further includes an evaporator compartment 40 and a condenser compartment 42 separated by a partition 44. The condenser compartment 42 includes the condenser 24, and the evaporator compartment 40 includes the inclined evaporator 28. The condenser 24 and the evaporator 28 are connected by a refrigeration line 46 containing the expansion device 26, completing the refrigeration cycle 20.

The evaporator 28 is angled A degrees from the front wall 38 of the refrigerated container 32 to increase the area of heat transfer in the evaporator 28 without requiring additional space. Preferably, the evaporator 28 is angled approximately 25° to 45°. from the front wall 38 of the refrigerated container 32. The cooled air is drawn through the evaporator 28 by an evaporator transverse fan 50 and discharged at the top 52 of the refrigerated container 32 below the trailer ceiling 54 to cool the cargo in the refrigerated container 32.

The air passing through the evaporator transverse fan 50 is naturally turned 90° by the fan 50. As the air is turned naturally 90° by the evaporator transverse fan 50, the air only turns 90° in the refrigeration unit 30. As there are fewer turns during operation, friction and loss of energy is reduced, increasing capacity.

During operation, air is drawn upwardly through the condenser 24 by a condenser transverse fan 58. The relatively warm air exits the condenser 24 and the refrigeration unit 30 above the trailer ceiling 54 in the same direction of road airflow during forward vehicle movement. Preferably, the condenser transverse fan 58 is substantially larger than the evaporator transverse fan 50 as the air flow through the condenser 24 is greater than the air flow through the evaporator 28. Most preferably, the condenser transverse fan 58 is approximately 1.2 to 1.5 times the size of the evaporator transverse fan 50 to accommodate for the higher amount of air flowing through the condenser fan 58. By employing a larger condenser transverse fan 58, the flow of air is maintained through the refrigeration cycle 20, minimizing wheel stress and retaining air speed.

The axes 60 and 62 of the heat exchanger fans 50 and 58, respectively, are substantially parallel to each other and to an axis 64 of an engine or motor shaft 66 which drives the fans 50 and 58. The heat exchanger fans 50 and 58 each include a pulley 80 and 82, respectively, and the motor shaft 66 includes a pulley 84. As the axes 60, 62, and 64 are substantially parallel, a continuous belt 68 passing over the pulleys 80, 82 and 84 drives the fans 50 and 58. Preferably, the engine or motor shaft 66 is positioned in the lower portion of the refrigeration unit 30. As the motor shaft 66 operates, the belt 68 drives the fans 50 and 58, drawing air through the heat exchangers 24 and 28.

The partition 44 includes a heat shield 70 and is positioned between the evaporator passageway 40 and the condenser passageway 42 to provide insulation. The partition 44 further includes extensions 72 extending between the trailer walls 38 and 54 and the frame 36 to provide additional insulation and prevent air from escaping between the walls 38 and 54 and the frame 36. Preferably, the extensions 72 include a plurality of corrugations 74 which press into the trailer walls 38 and 54. The contact of the plurality of corrugations 74 with the walls 38 and 54 act as an additional seal, providing further insulation.

During operation of the refrigeration unit 30, the compressor 22 and drive package 90 (motor and/or engine plus radiator) increase in temperature. An additional axial fan 76 is positioned near the compressor 22 to cool the compressor 22 and the drive package 90. If an additionally axial fan 76 is utilized, a separate drive mechanism 78 is employed to drive the fan 76, shown schematically.

There are several advantages to the transport refrigeration unit 30 of the present invention. For one, as the axes 60 and 62 of the fans 50 and 58 are substantially parallel to the axis 64 of the motor shaft 66, one continuous belt 68 dries the fans 50 and 58, simplifying the drive mechanism. Additionally, by utilizing an evaporator transverse fan 50, the air makes fewer turns in the system 20 as the air is turned by the fan 50, reducing system losses and friction for air exiting the evaporator 24.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A refrigeration unit comprising:

a compressor, a heat rejecting heat exchanger, a heat accepting heat exchanger, and an expansion device for circulating a refrigerant;

a heat accepting transverse fan having a first axis to draw cooled air through said heat accepting heat exchanger and into a refrigerated container;

a heat rejecting transverse fan having a second axis substantially parallel to said first axis to draw air through said heat rejecting heat exchanger; and a motor shaft having a third axis substantially parallel to said first axis and said second axis to drive said fans.

2. The refrigeration unit as recited in claim 1 wherein said air is discharged from said heat rejecting heat exchanger outside of said refrigeration unit.

3. The refrigeration unit as recited in claim 1 wherein said heat accepting transverse fan is approximately 1.2 to 1.5 times the size of said heat rejecting transverse fan.

4. The refrigeration unit as recited in claim 1 wherein said heat accepting transverse fan includes a first pulley, said heat rejecting transverse fan includes a second pulley, and said motor shaft includes a third pulley, operation of said motor shaft driving said heat exchanger fans by a continuous belt positioned around said pulleys.

5. The refrigeration unit as recited in claim 1 wherein a partition separates said heat rejecting heat exchanger and said heat accepting heat exchanger.

6. The refrigeration unit as recited in claim 5 wherein said partition includes at least one extension positioned between a frame of said refrigeration unit and a wall of a refrigerated container to provide insulation.

7. The refrigeration unit as recited in claim 1 wherein said heat accepting heat exchanger is inclined approximately 25° to 45° from a trailer wall of said refrigerated container.

8. The refrigeration unit as recited in claim 1 further including an axial fan employed to cool said compressor including a drive mechanism.

9. A refrigeration unit comprising:

a compressor, a heat rejecting heat exchanger, a heat accepting heat exchanger, and an expansion device for circulating a refrigerant;

a heat accepting transverse fan having a first axis to draw cooled air through said heat accepting heat exchanger and into a refrigerated container; and a heat rejecting transverse fan having a second axis substantially parallel to said first axis to draw air through said heat rejecting heat exchanger;

a partition separating said heat rejecting heat exchanger and said heat accepting heat exchanger including at least one extension positioned between a frame of said refrigeration unit and a wall of a refrigerated container to provide insulation, and each of said extensions includes a plurality of corrugations which press into said wall of said refrigerated container.

10. A refrigeration unit comprising:

a compressor to compress a refrigerant to a high pressure;

a heat rejecting heat exchanger for cooling said refrigerant;

an expansion device for reducing said refrigerant to a low pressure;

a heat accepting heat exchanger for evaporating said refrigerant;

a refrigerated container for being cooled by said heat accepting heat exchanger;

a heat accepting transverse fan having a first pulley and first axis to draw cooled air through said heat accepting heat exchanger and into said refrigerated container; and a heat rejecting transverse fan having a second pulley and a second axis to draw air through said heat rejecting heat exchanger outside said refrigerated container;

a motor having a third pulley and a third axis to drive said fans, said first, second and third axis being substantially parallel; and a continuous belt positioned around said pulleys, operation of said motor driving said heat exchanger fans by said belt.

11. The refrigeration unit as recited in claim 10 wherein said heat accepting transverse fan is approximately 1.2 to 1.5 times the size of said heat rejecting transverse fan.

12. The refrigeration unit as recited in claim 10 wherein a partition separates said heat rejecting heat exchanger and said heat accepting heat exchanger.

13. The refrigeration unit as recited in claim 12 wherein said partition includes at least one extension positioned between a frame of said refrigeration unit and a wall of a refrigerated container to provide insulation.

14. The refrigeration unit as recited in claim 10 wherein said heat accepting heat exchanger is inclined approximately 25° to 45° from a trailer wall of said refrigerated container.

15. The refrigeration unit as recited in claim 10 further including an axial fan employed to cool said compressor including a drive mechanism.

16. A refrigeration unit comprising:

a compressor to compress a refrigerant to a high pressure;

a heat rejecting heat exchanger for cooling said refrigerant;

an expansion device for reducing said refrigerant to a low pressure;

a heat accepting heat exchanger for evaporating said refrigerant;

a refrigerated container for being cooled by said heat accepting heat exchanger;

a heat accepting transverse fan having a first pulley and first axis to draw cooled air through said heat accepting heat exchanger and into said refrigerated container; and a heat rejecting transverse fan having a second pulley and a second axis to draw air through said heat rejecting heat exchanger outside said refrigerated container;

a motor having a third pulley and a third axis to drive said fans, said first, second and third axis being substantially parallel;

a continuous belt positioned around said pulleys, operation of said motor driving said heat exchanger fans by said belt; and a partition separating said heat rejecting heat exchanger and said heat accepting heat exchanger including at least one extension positioned between a frame of said refrigeration unit and a wall of a refrigerated container to provide insulation, and each of said extensions includes a plurality or corrugations which press into said wall of said refrigerated container.

17. A method for cooling a refrigerated container with a refrigeration system comprising the steps of:

(1) providing a refrigerant cycle including a compressor, a heat accepting heat exchanger, an expansion device and a heat rejecting heat exchanger;

(2) drawing cooled air through a heat accepting heat exchanger and into said refrigerated container with a heat accepting transverse fan having a first axis; and (3) drawing air through a heat rejecting heat exchanger and outside of said refrigerated container with a heat rejecting transverse fan having a second axis substantially parallel to said first axis; and (4) driving said transverse fans with a drive mechanism having a third axis substantially parallel to said first axis and said second axis.

* * * * *